United States Patent
Kikuchi

Patent Number: 5,852,097
Date of Patent: Dec. 22, 1998

[54] COMPOSITION FOR TREAD RUBBER OF TIRES

[75] Inventor: Naohiko Kikuchi, Kobe, Japan

[73] Assignee: Sumitomo Rubber Industries, Ltd., Hyogo-ken, Japan

[21] Appl. No.: 908,976

[22] Filed: Aug. 8, 1997

Related U.S. Application Data

[63] Continuation of Ser. No. 580,246, Dec. 28, 1995, abandoned.

[30] Foreign Application Priority Data

Dec. 28, 1994 [JP] Japan .................................. 6-329038

[51] Int. Cl.$^6$ ...................................................... C08K 3/00
[52] U.S. Cl. ......................... 524/492; 524/493; 524/495; 524/496
[58] Field of Search ..................... 524/492, 493, 524/495, 496

[56] References Cited

U.S. PATENT DOCUMENTS

| | | | |
|---|---|---|---|
| 5,006,603 | 4/1991 | Takaki et al. | 525/105 |
| 5,066,721 | 11/1991 | Hamada et al. | 525/102 |

FOREIGN PATENT DOCUMENTS

| | | |
|---|---|---|
| 0265070 | 4/1988 | European Pat. Off. . |
| 0329589 | 8/1989 | European Pat. Off. . |
| 0620250 | 10/1994 | European Pat. Off. . |
| 64-5608 | 1/1989 | Japan . |
| 3-252431 | 11/1991 | Japan . |
| 5-51484 | 3/1993 | Japan . |

OTHER PUBLICATIONS

Database WPI, Section Ch. Week 8929, Derwent Pub. Ltd. AN 89–209364 & JP–A–01 145 205.

English language abstract of Japanese Patent Publication Kokai No. 5–51484.

English language abstract of Japanese Patent Publication Kokuku No. 64–5608.

English language abstract of Japanese Patent Publication Kokai No. 3–252431.

*Primary Examiner*—Edward J. Cain
*Attorney, Agent, or Firm*—Birch, Stewart, Kolasch & Birch, LLP

[57] ABSTRACT

A rubber composition suitable for use in tread of tires, having excellent rolling characteristics and abrasion resistance and an improved dimensional stability as not causing shrinkage when extruded into rubber sheets for treads, which comprises a rubber component, 20 to 60 parts by weight of silica, 3 to 12 parts by weight of a silane coupling agent, and 2 to 10 parts by weight of a short fiber, respectively, per 100 parts by weight of the rubber component.

16 Claims, No Drawings

COMPOSITION FOR TREAD RUBBER OF TIRES

This application is a continuation of application Ser. No. 08/580,246 filed on Dec. 28, 1995, now abandoned.

BACKGROUND OF THE INVENTION

The present invention relates to a rubber composition suitable for use in treads of tires having improved characteristics such as rolling characteristics and abrasion resistance and having an excellent dimensional stability, and more particularly to a rubber composition for tire treads containing a short fiber filler.

For achieving fuel cost reduction increasingly required for recent cars, it is required to decrease the rolling resistance of tires. Various rubber compositions for tire treads are proposed in order to decrease the rolling resistance of tires.

It is known that the rolling resistance is decreased by incorporating carbon black in a decreased amount or a low grade of carbon black into a rubber composition for tire treads. However, this method has a problem that the abrasion resistance of treads is deteriorated.

In order to provide a rubber composition for tire treads which can decrease the rolling resistance without deteriorating the abrasion resistance, it is proposed to incorporate silica and a silane coupling agent as reinforcing materials other than carbon black. However, such a rubber composition containing silica and a silane coupling agent has a tendency that the shrinkage of extrudates of the composition becomes large. Thus, management of process steps is difficult.

In general, an extruded tread causes a slight shrinkage in the direction of extrusion. In particular, rubber compositions having a small content of a filler contemplated to provide low feel cost tires have a larger tendency of shrinkage. Also, the shrinkage is particularly large in the vicinity of cut position of an extruded rubber sheet, so the rubber sheet becomes thicker at the cut portion. If tires are produced by using a tread rubber sheet having an increased thickness in the vicinity of the cut portion due to the shrinkage, the thickness in the vicinity of the tread joint becomes large, thus resulting in lowering of the roundness of tires which may cause vibration of cars in running.

It is an object of the present invention to provide a rubber composition suitable for use in tire treads having excellent characteristics such as rolling characteristics, abrasion resistance and dimensional stability.

A further object of the present invention is to provide a rubber composition suitable for use in tire treads containing silica as a reinforcing material, which is improved in dimensional stability.

These and other objects of the present invention will become apparent from the description hereinafter.

SUMMARY OF THE INVENTION

It has been found that the shrinkage of a rubber sheet extruded from a rubber composition containing silica and a silane coupling agent can be prevented to improve the processability of the composition and to provide tires having an excellent dimensional stability by incorporating a small amount of a short fiber into the composition.

In accordance with the present invention, there is provided a rubber composition suitable for tire treads comprising a rubber component, 20 to 60 parts of silica, 3 to 12 parts of a silane coupling agent, and 2 to 10 parts of a short fiber, said parts all being parts by weight per 100 parts by weight of said rubber component.

The rubber composition of the present invention has excellent rolling characteristics as required to provide low fuel cost tires and an excellent abrasion resistance, since it contains silica as a reinforcing material. Moreover, the rubber composition is remarkably improved in dimensional stability which is deteriorated by incorporation of silica. Thus, the rubber composition for tire treads of the present invention can provide low fuel cost tires having an excellent dimensional stability.

DETAILED DESCRIPTION

The kind of rubbers used as the rubber component of the composition of the present invention is not particularly limited. Diene rubbers such as natural rubber (NR), isoprene rubber (IR), butadiene rubber (BR) and styrene-butadiene rubber (SBR) and other known rubbers used in tire production can be suitably used alone or in admixture thereof.

The kind of silica is not particularly limited. For instance, anhydrous silica (silicic anhydride) prepared by a dry process and hydrous silica prepared by a wet process, as known as white carbon, are suitably used in the present invention.

Silica is used in an amount of 20 to 60 parts by weight, preferably 30 to 50 parts by weight, per 100 parts by weight of the rubber component. If the amount of silica is less than 20 parts by weight, the reinforcing effect is not sufficient and the obtained cured rubbers are inferior in abrasion resistance. If the amount is more than 60 parts by weight, the rolling characteristics are deteriorated.

Any of known silane coupling agents can be used in the present invention, e.g. silane coupling agents as represented by the formula: $RSiX_n$ wherein R is an organic functional group having vinyl group, glycidoxy group, methacryloyl group, amino group or mercapto group, X is a hydrolyzable group such as chlorine or an alkoxy group, and n is 2 or 3, such as bis(triethoxysilylpropyl)tetrasulfide, γ-mercaptopropyltrimethoxysilane, or γ-glycidoxypropyltrimethoxysilane.

The silane coupling agent is used in an amount of 3 to 12 parts by weight per 100 parts by weight of the rubber component. If the amount of the silane coupling agent is less than 3 parts by weight, since a reaction between silica and rubber does not sufficiently proceed, sufficient reinforcement is not obtained and the abrasion resistance is deteriorated, and the rolling characteristics are also deteriorated. Even if the silane coupling agent is used in an amount of more than 12 parts by weight, a further reinforcing effect is not substantially obtained, while the cost increases, thus unpractical. Although the amount of the silane coupling agent can be suitably selected within the above-mentioned range, it is efficient to use the silane coupling agent in an amount of about 10% of the amount of silica used.

The short fiber orients in the direction of extrusion when the tread rubber composition is extruded in a usual extrusion step to form a rubber sheet for tire tread, and serves to inhibit the shrinkage of the rubber sheet.

Short fibers having an average diameter D of 0.1 to 0.5 μm, preferably 0.2 to 0.4 μm, an average length L of 50 to 500 μm, preferably 100 to 400 μm, and an L/D ratio of 100 to 5,000, preferably 300 to 2,000, are used in the present invention. If short fibers having dimensions outside the above ranges are used, no sufficient shrinkage-inhibiting effect is obtained or breakdown characteristics of rubber are deteriorated.

The materials constituting the short fibers are not particularly limited so long as the short fibers are organic fibers having dimensions within the above ranges. For example, there can be used a synthetic fiber such as nylon fiber, aramid fiber or polyester fiber, a semisynthetic fiber such as rayon fiber, and a natural fiber such as cotton fiber. The short fibers may be used as they are, or may be previously surface-treated with a known coupling agent in order to improve the adhesive property to a rubber.

Such short fibers are commercially available.

The short fiber is used in an amount of 2 to 10 parts by weight, preferably 3 to 5 parts by weight, per 100 parts by weight of the rubber component. If the amount of the short fiber is less than 2 parts by weight, sufficient shrinkage-inhibiting effect is not obtained, and if the amount is more than 10 parts by weight, the abrasion resistance is remarkably deteriorated. The use of the short fiber in an amount of 3 to 5 parts by weight is preferred, since the shrinkage is inhibited without greatly affecting the physical properties of cured rubbers.

It is preferable to further incorporate carbon black in addition to silica or to substitute carbon black for a part of silica as a reinforcing material other than silica. A high reinforcing carbon black having an iodine adsorption number of 100 to 190 mg/g is preferably used as a carbon black to be incorporated into the rubber composition for tire treads according to the present invention. Carbon black having an iodine adsorption number of 140 to 180 mg/g is particularly preferred from the viewpoint of abrasion resistance. If the iodine adsorption number is less than 100 mg/g, since the reinforcing ability is not sufficient, lowering of the abrasion resistance is brought about when the amount is small. If the iodine adsorption number is more than 190 mg/g, heat generation of rubber increases, thus deteriorating the rolling characteristics. Examples of the carbon black satisfying such a requirement are, for instance, N220 (iodine adsorption number 121 mg/g), N234 (iodine adsorption number 120 mg/g), N110 (iodine adsorption number 145 mg/g) and the like. Carbon black N110 is particularly preferred for the reasons mentioned above.

It is preferable that the amount of carbon black is at most 30 parts by weight per 100 parts by weight of the rubber component, since the rolling characteristics are deteriorated and the effects to be produced by incorporation of silica may be offset if the amount of carbon black exceeds 30 parts by weight. It is preferable from the viewpoint of balance between the rolling characteristics and the abrasion resistance that the amount of carbon black is from 15 to 30 parts by weight per 100 parts by weight of the rubber component.

The rubber composition for tire treads of the present invention can contain usual other additives such as a curing agent, a curing accelerator, an activator such as zinc oxide or stearic acid, an antioxidant, a softener, a plasticizer and an inorganic filler such as calcium carbonate or clay, and may further contain, as occasion demands, a curing retarder and a tackifier.

The rubber composition of the present invention can be prepared and cured in a usual manner.

The present invention is more specifically described and explained by means of the following Examples in which all parts are by weight. It is to be understood that the present invention is not limited to the Examples.

EXAMPLES 1 TO 5 AND COMPARATIVE EXAMPLES 1 TO 9

Rubber compositions containing varied amounts of a short fiber, carbon black, silica, a silane coupling agents and an oil as shown in Table 3 were prepared according to the recipe shown in Table 2 by mixing the ingredients in a Banbury mixer.

In these examples, a nylon 6 fiber having an average diameter D of 0.3 $\mu$m, an average length L of 300 $\mu$m and an L/D ratio of 1,000 was used in the form of a masterbatch wherein the nylon fiber was dispersed in and grafted to natural rubber through a coupling agent and the ratio of natural rubber to nylon 6 was 2:1 by weight (the masterbatch being available under the trade mark "UBEPOL HE-0100" made by Ube Industries, Ltd., Japan). Also, three kinds of carbon black shown in the following Table 1 were used as the carbon black.

TABLE 1

| | Kind | Carbon black Iodine adsorption number (mg/g) |
|---|---|---|
| (a) | N110 | 145 |
| (b) | N220 | 121 |
| (c) | N339 | 90 |

TABLE 2

| Ingredients | Amount (part) |
|---|---|
| Natural rubber (RSS #3) | 40 |
| SBR | 60 |
| Short fiber | variable |
| Carbon black | variable |
| Silica | variable |
| Silane coupling agent | variable |
| Aromatic oil | variable |
| Wax | 1 |
| Antioxidant (6PPD) | 1 |
| Stearic acid | 2 |
| Zinc oxide | 3 |
| Sulfur | 1.5 |
| Curing accelerator | 2.0 |

The amount of natural rubber shown in Table 2 includes the amount of natural rubber included in the short fiber masterbatch. Also, the SBR, silica and silane coupling agent shown in Table 2 are as follows:

SBR: styrene-butadiene rubber commercially available under the trade mark "SBR SL574" made by Japan Synthetic Rubber Co., Ltd.

Silica: commercially available under the trade mark "NIPSIL VN3" made by Nippon Silica Kogyo Kabushiki Kaisha Silane coupling agent: bis(triethoxysilylpropyl) tetrasulfide commercially available under the trade mark "Si-69" made by Degussa Co.

The rubber compositions were extruded into a sheet in the form of a tread by a general extruder used in tire production, and the rubber sheets were cooled and cut into the predetermined size for tire production. Tires having a size of 185/65R14 were prepared in a usual manner by using the obtained rubber sheets in the tread portion.

The shrinkage of extruded tread, and the roundness, rolling resistance and abrasion resistance of tires were measured and estimated according to the following methods.

The results are shown in Table 3 wherein Comparative Example 9 shows a conventional rubber composition for a tire tread of low fuel cost type which contains only carbon black as the reinforcing material.

(1) Shrinkage of tread (mm)

The rubber sheet extruded in the form of tread from a rubber composition and cut to a length of 1790 mm was allowed to stand for 24 hours, and the length thereof was measured. The difference between the initial length and the length after 24 hours was represented as the amount of shrinkage.

(2) Roundness of tire

The abrasion resistance was represented as an index to the result of Comparative Example 9. The larger the value, the better the abrasion resistance.

TABLE 3

|  | Ex. 1 | Ex. 2 | Ex. 3 | Ex. 4 | Ex. 5 | Com. Ex. 1 | Com. Ex. 2 |
|---|---|---|---|---|---|---|---|
| Short fiber masterbatch (part) | | | | | | | |
| Amount of masterbatch | 9 | 9 | 9 | 9 | 9 | — | — |
| Amount of short fiber | 3 | 3 | 3 | 3 | 3 | — | — |
| Carbon black | | | | | | | |
| Kind | a | b | a | a | — | a | — |
| Amount (part) | 25 | 25 | 15 | 25 | 0 | 25 | — |
| Silica (part) | 30 | 30 | 40 | 50 | 50 | 30 | 50 |
| Silane coupling agent (part) | 3 | 3 | 4 | 5 | 5 | 3 | 3 |
| Aromatic oil (part) | 3 | 5 | 5 | 15 | 5 | 5 | 5 |
| Shrinkage (mm) | 8 | 8 | 10 | 7 | 12 | 35 | 42 |
| Roundness of tire | | | | | | | |
| Average value | 4.92 | 5.01 | 5.65 | 4.93 | 6.02 | 8.66 | 10.24 |
| Variation | 1.11 | 1.08 | 1.14 | 1.06 | 1.21 | 2.07 | 3.72 |
| Rolling resistance | 114 | 119 | 117 | 102 | 120 | 115 | 121 |
| Abrasion resistance | 107 | 102 | 101 | 117 | 105 | 110 | 103 |
|  | Com. Ex. 3 | Com. Ex. 4 | Com. Ex. 5 | Com. Ex. 6 | Com. Ex. 7 | Com. Ex. 8 | Com. Ex. 9 |
| Short fiber masterbatch (part) | | | | | | | |
| Amount of masterbatch | 45 | 9 | 9 | 9 | 9 | 9 | — |
| Amount of short fiber | 15 | 3 | 3 | 3 | 3 | 3 | — |
| Carbon black | | | | | | | |
| Kind | a | c | a | a | — | a | c |
| Amount (part) | 25 | 25 | 25 | 40 | — | 25 | 50 |
| Silica (part) | 30 | 30 | 15 | 30 | 70 | 30 | — |
| Silane coupling agent (part) | 3 | 3 | 3 | 3 | 7 | — | — |
| Aromatic oil (part) | 15 | 5 | — | 15 | 15 | 5 | 5 |
| Shrinkage (mm) | 5 | 8 | 11 | 7 | 9 | 8 | 12 |
| Roundness of tire | | | | | | | |
| Average value | 4.88 | 4.34 | 4.88 | 5.00 | 4.53 | 4.51 | 6.02 |
| Variation | 1.03 | 1.16 | 1.17 | 1.23 | 1.24 | 1.10 | 1.46 |
| Rolling resistance | 111 | 123 | 123 | 94 | 102 | 96 | 100 |
| Abrasion resistance | 91 | 84 | 87 | 115 | 110 | 79 | 100 |

RFV (radial force variation) (load fluctuation force in the vertical direction appearing at the axis of rotation) was measured by a tire uniformity machine with respect to tires of 185/65R14. The larger the RFV value, the worse the roundness of tire.

The measurement was made under conditions of inner air pressure 2.0 kgf/cm$^2$, load 396 kgf, rim 5.5JJ×14 and number of revolutions 60 rpm with respect to 40 sample tires per each rubber composition. The average value of roundness and variation shown in Table 3 are those of 40 sample tires.

(3) Rolling resistance

The tire was attached to a rolling resistance measuring machine of drum type having a diameter of 1707.6 mm, and tested under conditions of inner air pressure 2.0 kgf/cm$^2$, load 350 kgf, rim 5.5JJ×14 and speed 80 km/hour.

The rolling resistance was represented as an index to the result of Comparative Example 9 regarded as 100. The smaller the index, the better the rolling characteristics.

(4) Abrasion resistance

The tires were attached to a 1600 cc car. Actual running test of the car was made and the amount of abrasion was measured.

As apparent from the results of Comparative Examples 1, 2 and 9 shown in Table 3, the rolling characteristics and abrasion resistance are improved by incorporating silica as a reinforcing material, but the shrinkage of tread rubber sheet increases and the roundness of tires is deteriorated.

It can be seen from the results shown in Table 3, for example, from comparison between the results of Com. Exs. 1, 2 and 9 and the results of Com. Exs. 3 to 8, that the shrinkage of tread and the roundness of tire are improved by incorporating a short fiber into silica-containing rubber compositions. However, even if such rubber compositions incorporated with a short fiber satisfy requirements of the tread shrinkage and the tire roundness, either the rolling characteristics or the abrasion resistance is not satisfied when the short fiber is used in an excessive amount (Com. Ex. 3), when carbon black poor in reinforcing ability is used (Com. Ex. 4), when the amount of silica is too small (Com. Ex. 5) or when the amount of carbon black is too large (Com. Ex. 6).

In contrast, as apparent from the results shown in Table 3, the rubber composition of the present invention can provide tires having excellent in rolling characteristics, abrasion resistance and dimensional stability. Also, it can be seen from comparison between the results of Examples 1 to 3 and the results of Example 5 that the tread shrinkage and the tire roundness are further improved by replacing a part of silica with carbon black as a reinforcing material, although the rolling characteristics are somewhat deteriorated.

Comparative Example 7 is an example according to the present invention wherein silica is used in an amount exceeding 60 parts, namely in an amount of 70 parts. The rubber composition of Com. Ex. 7 has satisfactory rolling characteristics, abrasion resistance and dimensional stability, but further improvement thereof conforming to the use of an increased amount of silica is not obtained as compared with the use of a less amount of silica and, therefore, the use of such a large amount of silica is not economical.

In addition to the ingredients used in Examples, other ingredients can be used in the Examples as set forth in the specification to obtain substantially the same results.

What is claimed is:

1. A rubber composition suitable for tire treads comprising a rubber component consisting of a diene rubber, 20 to 60 parts of silica, 3 to 12 parts of a silane coupling agent, and 2 to 10 parts of an organic short fiber, wherein said organic short fiber has an average diameter of 0.1 to 0.5 $\mu$m, an average length of 50 to 500 $\mu$m and a length/diameter ratio of 100 to 5,000, said silane coupling agent is a member selected from the group consisting of a compound of the formula: RSiXn wherein R is an organic functional group having vinyl group, glycidoxy group, methacryloly group, amino group or mercapto group, X is a hydrolyzable group and n is 2 or 3, and bis(triethoxysilylpropyl)tetrasulfide, and said parts all being parts by weight per 100 parts by weight of said rubber component.

2. The composition of claim 1, which contains 0 to 30 parts by weight of carbon black having an iodine adsorption number of 100 to 190 mg/g per 100 parts by weight of said rubber component.

3. The composition of claim 1, which contains 15 to 30 parts by weight of carbon black having an iodine adsorption number of 100 to 190 mg/g per 100 parts by weight of said rubber component.

4. The composition of claim 1, wherein said rubber component is at least one member selected from the group consisting of natural rubber, isoprene rubber, butadiene rubber and styrene-butadiene rubber.

5. The composition of claim 1, which contains 30 to 50 parts by weight of silica and 15 to 30 parts by weight of carbon black having an iodine adsorption number of 100 to 190 mg/g.

6. The composition of claim 1, wherein the amount of said short fiber is from 3 to 5 parts by weight.

7. The composition of claim 1, wherein said short fiber is at least one member selected from the group consisting of synthetic fibers, semisynthetic fibers and natural fibers.

8. A rubber composition suitable for tire treads comprising a rubber component consisting of a diene rubber, 20 to 60 parts of silica, 3 to 12 parts of a silane coupling agent, 2 to 10 parts of an organic short fiber, and 0 to 25 parts by weight of carbon black having an iodine absorption number of 100 to 190 mg/g, said organic short fiber having an average diameter of 0.1 to 0.5 $\mu$m, an average length of 50 to 500 $\mu$m and a length/diameter ratio of 100 to 5,000, said silane coupling agent being a member selected from the group consisting of a compound of the formula: RSiXn wherein R is an organic functional group having vinyl group, glycidoxy group, methacryloyl group amino group or mercapto group, X is a hydrolyzable group and n is 2 or 3, and bis(triethoxysilylpropyl)tetrasulfide, and said parts all being parts by weight per 100 parts by weight of said rubber component.

9. The composition of claim 8, wherein said rubber component is at least one member selected from the group consisting of natural rubber, isoprene rubber, butadiene rubber and styrene-butadiene rubber.

10. The composition of claim 8, wherein the amount of said carbon black is from 15 to 25 parts by weight per 100 parts by weight of said rubber component.

11. The composition of claim 8, wherein the amount of said short fiber is from 3 to 5 parts by weight per 100 parts by weight of said rubber component.

12. The composition of claim 1, wherein said organic short fiber comprises a member selected from the group consisting of nylon, aramid, polyester, rayon and cotton fibers.

13. The composition of claim 12, wherein said organic short fiber comprises a nylon fiber having an average diameter D of 0.3 $\mu$m, an average length L of 300 $\mu$m and an L/D ratio of 1000.

14. The composition of claim 13, wherein the short fiber is used in the form of a master batch wherein nylon fiber is dispersed in and grafted to natural rubber through a coupling agent and the ratio of natural rubber to nylon is 2:1 by weight.

15. A rubber composition suitable for tire treads comprising a rubber component consisting of a diene rubber, 20 to 60 parts of silica, 3 to 12 parts of a silane coupling agent which comprises bis(triethoxysilylpropyl)tetrasulfide, and 2 to 10 parts of an organic short fiber which has an average diameter D of 0.1 to 0.5 $\mu$m, an average length L of 50 to 500 $\mu$m and an L/D ratio of 100 to 5,000 said parts all being parts by weight per 100 parts by weight of said rubber component.

16. The composition of claim 1, wherein said silane coupling agent is a member selected from the group consisting of bis(triethoxysilylpropyl)tetrasulfide, γmercaptopropyltrimethoxysilane and γglycidoxypropyltrimethoxysilane.

* * * * *